No. 630,502. Patented Aug. 8, 1899.
E. T. GREENFIELD.
MACHINE FOR MAKING ARMORED ELECTRIC CABLES.
(Application filed Dec. 15, 1898.)

(No Model.) 6 Sheets—Sheet 1.

Witnesses
Edward L. Rowland.
Benjamin Miller.

Edwin T. Greenfield, Inventor
By his Attorneys
Kerr, Page & Cooper

No. 630,502. Patented Aug. 8, 1899.
E. T. GREENFIELD.
MACHINE FOR MAKING ARMORED ELECTRIC CABLES.
(Application filed Dec. 15, 1898.)
(No Model.) 6 Sheets—Sheet 2.

No. 630,502. Patented Aug. 8, 1899.
E. T. GREENFIELD.
MACHINE FOR MAKING ARMORED ELECTRIC CABLES.
(Application filed Dec. 15, 1898.)
(No Model.) 6 Sheets—Sheet 3.

No. 630,502. Patented Aug. 8, 1899.
E. T. GREENFIELD.
MACHINE FOR MAKING ARMORED ELECTRIC CABLES.
(Application filed Dec. 15, 1898.)
(No Model.) 6 Sheets—Sheet 4.

Witnesses
Edward Rowland.
Benjamin Miller

Edwin T. Greenfield Inventor
By his Attorneys
Kerr, Page & Cooper

No. 630,502. Patented Aug. 8, 1899.
E. T. GREENFIELD.
MACHINE FOR MAKING ARMORED ELECTRIC CABLES.
(Application filed Dec. 15, 1898.)
(No Model.) 6 Sheets—Sheet 5.

No. 630,502. Patented Aug. 8, 1899.
E. T. GREENFIELD.
MACHINE FOR MAKING ARMORED ELECTRIC CABLES.
(Application filed Dec. 15, 1898.)

(No Model.) 6 Sheets—Sheet 6.

UNITED STATES PATENT OFFICE.

EDWIN T. GREENFIELD, OF NEW YORK, N. Y.

MACHINE FOR MAKING ARMORED ELECTRIC CABLES.

SPECIFICATION forming part of Letters Patent No. 630,502, dated August 8, 1899.

Application filed December 15, 1898. Serial No. 699,327. (No model.)

*To all whom it may concern:*

Be it known that I, EDWIN T. GREENFIELD, a citizen of the United States, residing at New York, in the borough of Manhattan, county of New York, and State of New York, have invented certain new and useful Improvements in Machines for Making Armored Electric Cables, of which the following is a full, clear, and exact description, reference being had to the accompanying drawings, in which like letters and figures of reference indicate corresponding parts.

My invention embraces a machine having three groups of devices—first, a mechanism for feeding unarmored cable; second, mechanism for forming and applying the armor, and, third, mechanism for reeling or winding up the armored cable, all of these groups being so connected together as to produce a complete armored cable wound upon a reel or otherwise prepared for shipment, the three groups of mechanism being detachably connected together so that any one may be removed without necessarily disturbing the functions of the others.

The main and preferably the central group comprises devices for manufacturing the armor and applying it spirally to the cable as it is delivered from one of the side wings (or groups of mechanism) of the complete machine and delivering the completed armored cable to the other wing, (or third group of mechanism,) which winds it upon a reel or otherwise prepares it for shipment. According to my invention the speed at which the armor is manufactured and applied regulates, on the one hand, the speed at which the unarmored cable is delivered to the armoring mechanism, and, on the other, the speed at which the reel revolves upon which the completed cable is wound. In other words, my invention embraces a cable-armoring machine all the cable-handing parts of which are revoluble in the direction in which the spiral armor is wound, the said machine being automatic and self-regulating within the limits at which the armor is applied.

In the accompanying drawings.

My invention, consisting, as it does, of a novel mechanism, whereby electric cables are armored, is illustrated in the accompanying drawings as applicable to the armoring of electric cables like that disclosed in a prior patent granted to me on the 27th day of December, 1898, and bearing No. 616,612.

Figure 1:
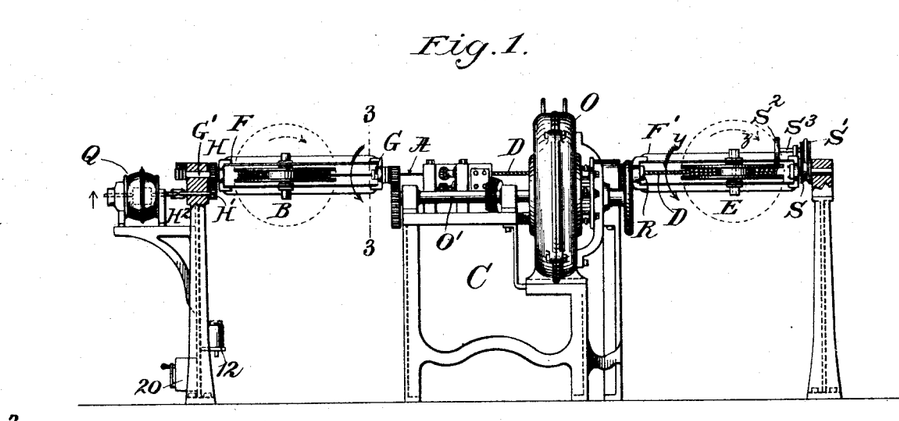
Figure 1 is a longitudinal elevation of the completed machine with the exception of the delivery-reels and guides for the metallic armor-strips, which are omitted for the sake of clearness.

Referring now to Fig. 1 of the drawings, an unarmored cable A is therein illustrated as wound upon a left-hand reel B, and as said cable is drawn from the reel it passes through an armor-forming die in the central mechanism C in such manner as to armor the cable, after which it is drawn continuously forward and wound upon a second or right-hand reel E.

Figure 4:
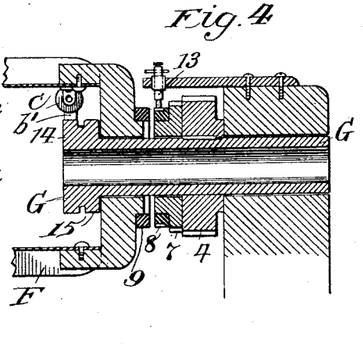
Fig. 4 is a cross-sectional view of Fig. 2.
Figures 7, 8, 9:
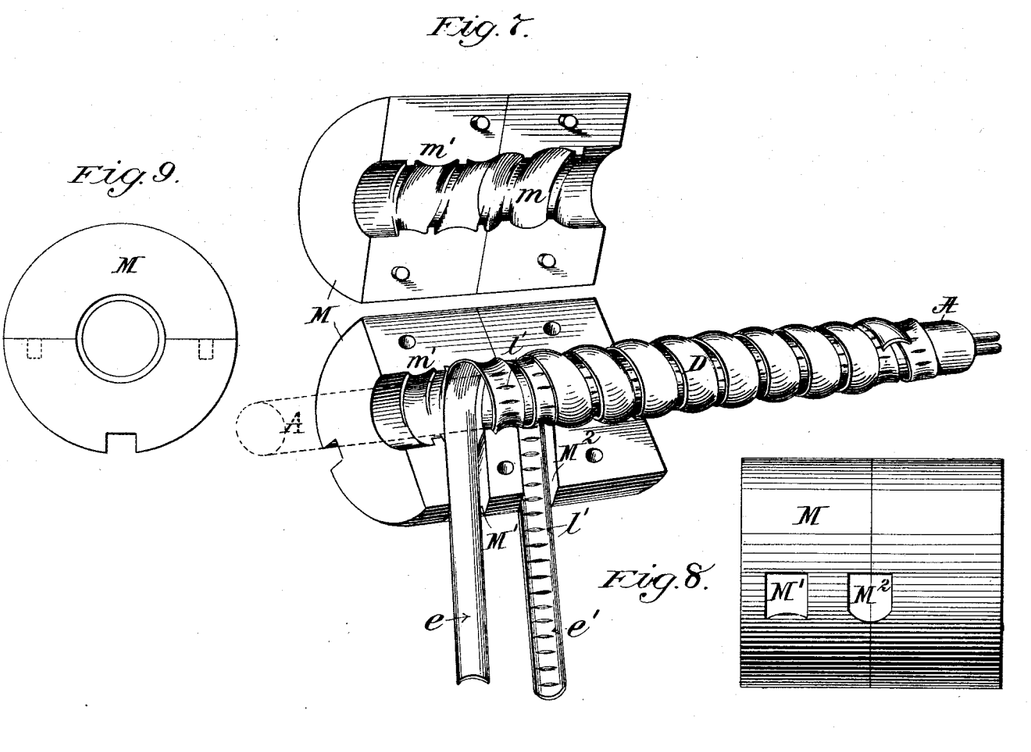
Fig. 7 is a perspective view of the armor-forming die and a section of insulated cable located therein, illustrating the method of armoring the same by means of said die, the latter being separated or opened for the purpose of showing more clearly the interior structure thereof and its method of operation.
Fig. 8 is a side elevational view of the armor-forming die.
Fig. 9 is an end elevational view thereof.

The unarmored cable A, as appears more clearly from the end protruding at the right of Fig. 7, is of any ordinary construction, being composed of one or more wires or conductors surrounded by insulating material. A reel B or other suitable device, upon which is wound the cable A, is placed in the frame F of my machine. This frame F is mounted upon revoluble shafts G G'. The outer or left-hand shaft G' is operatively connected to an electric motor Q, which is normally inactive, as by the gears H H' and shaft H². The inner or right-hand shaft G is connected, as by a train of gears and a series of ratchets and pawls, (the purpose and details of which will be explained hereinafter,) with the shaft O' of a motor O, by which alone the said shaft G is normally driven. The said shaft G may be hollow, as shown in Fig. 4, so that the insulated cable as it is drawn from the reel B passes through it and into the central or main group of mechanism C, Fig. 1.

Figure 5:
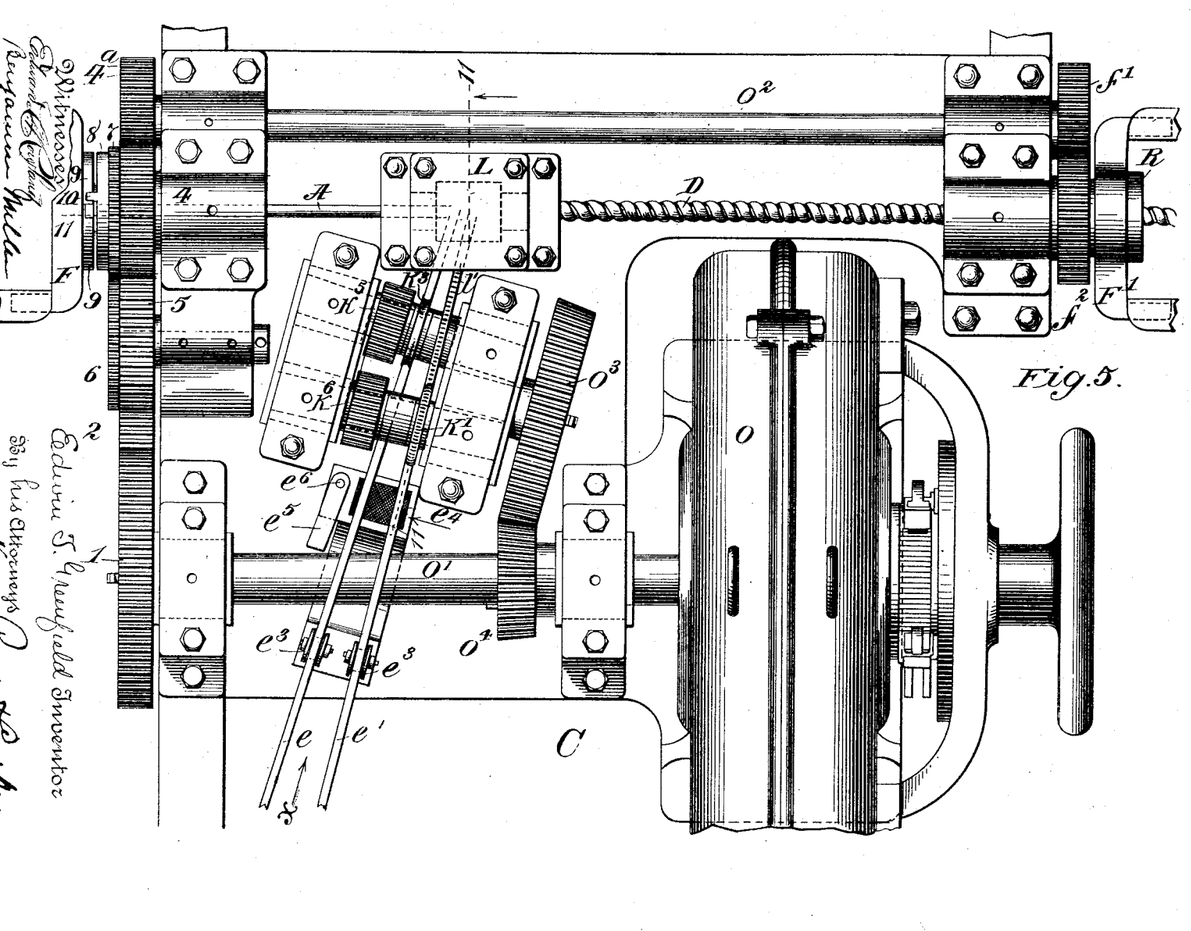
Fig. 5 is a plan view of the central group of mechanisms upon the same scale as Fig. 2.

The central group of mechanism C, which is most clearly illustrated in Fig. 5, is that by which a flexible metallic armor D is formed from the flat metal bands or strips $e\ e'$ and applied spirally to the cable A as it is drawn from the reel B.

The operation of the armor-forming mechanism is as follows: As the flexible flat strips $e\ e'$, of any suitable metal—as brass, iron, aluminium, &c.—are drawn from any suitable source, as rolls or coils, (not shown,) in the direction of the arrow $x$ they pass over guide-rollers, as $e^3\ e^3$, and across a pad $e^4$, saturated with oil. A downwardly-pressing spring $e^5$, pivoted at $e^6$, may be swung across the strips $e\ e'$ to press them down upon the pad to thoroughly saturate them with oil, or other means may be employed for lubricating the strips before they pass into guides or grooves in the long trough or box J, Figs. 10 and 11. This trough J is omitted in Fig. 5 for the sake of clearness, it being situated immediately beneath the forming and feeding rolls K' K³. As will be seen in Figs. 10 and 11, the strip $e$ enters the trough J at a higher plane than the strip $e'$, but passes diagonally downward toward the plane of $e'$, which travels at about the same level. The strips may also converge as they pass forward, Fig. 13.

Figure 6:
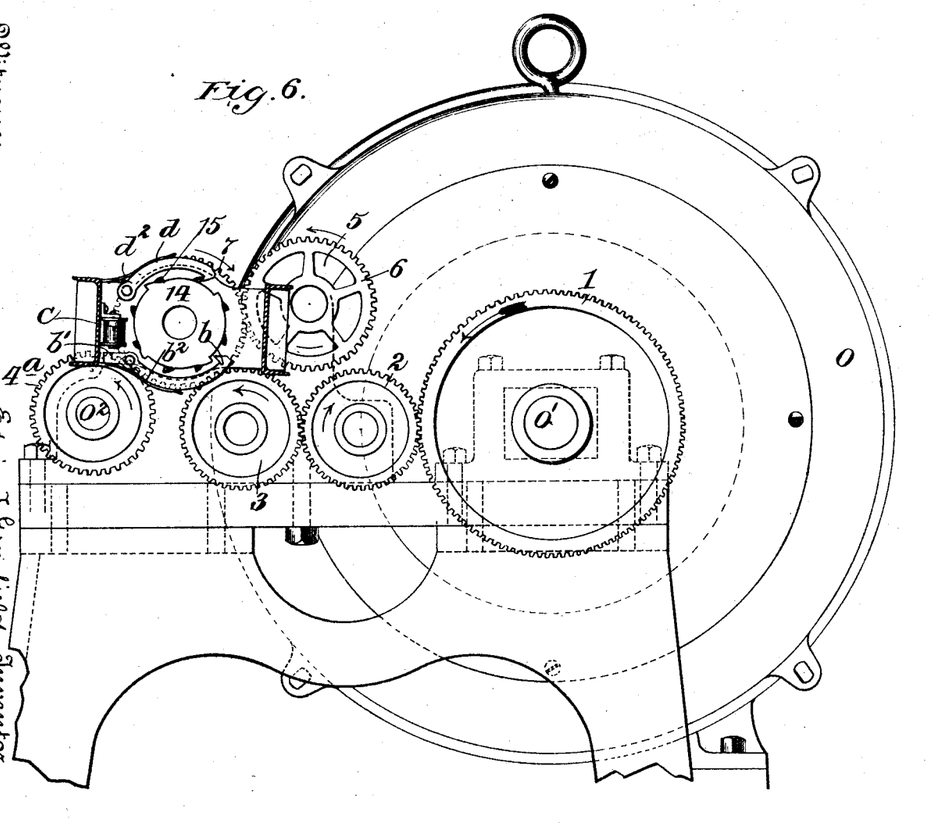
Fig. 6 is an enlarged side elevational view of the central group of mechanisms, taken on the line 3 3 of Fig. 1, and as seen looking at that figure from the left toward the right-hand side of the drawings, said figure showing the speed-regulating gear, all other parts being removed for the sake of clearness.
Figures 10, 11, 12, 13:
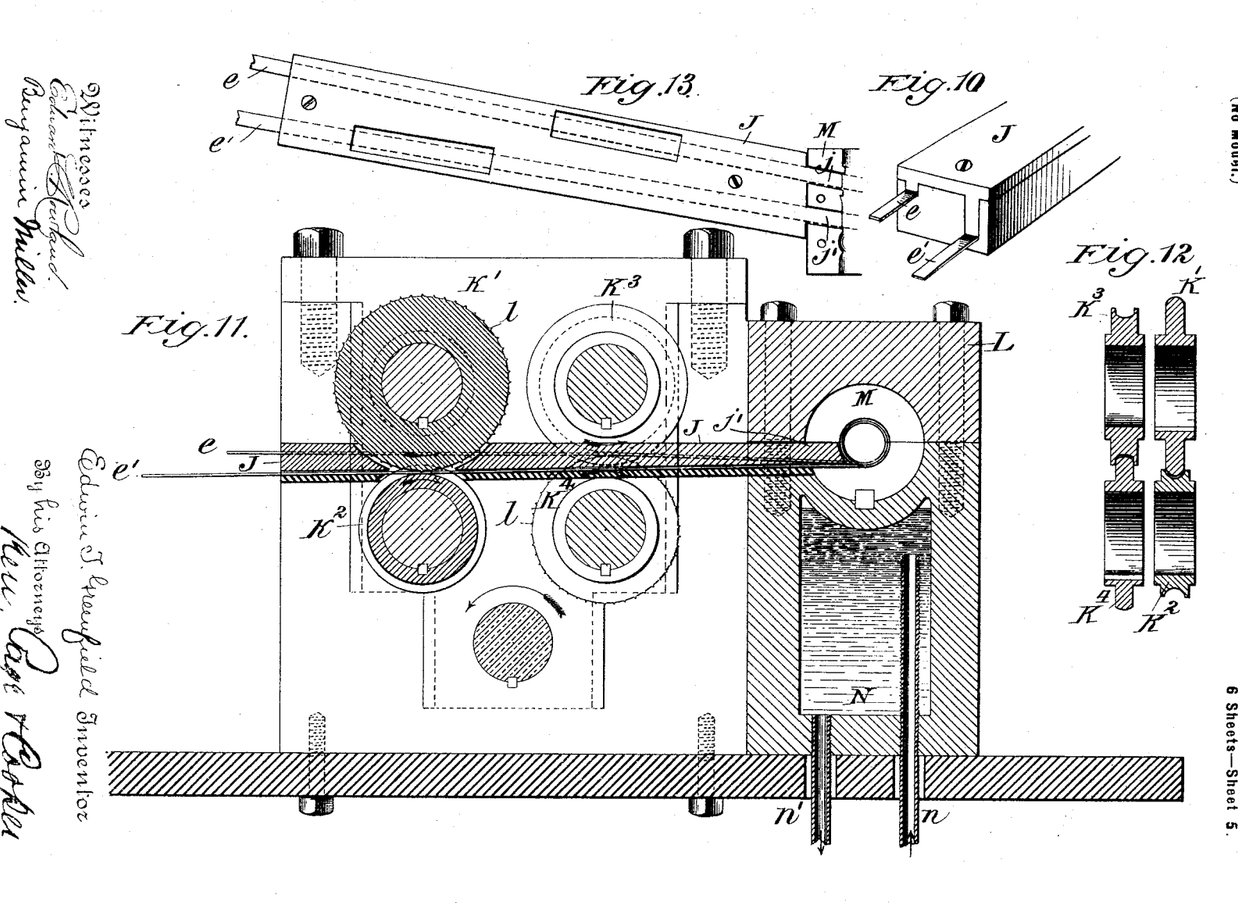
Fig. 10 is a perspective view of one end of a trough which is provided with guides or grooves for guiding or directing the metallic strips of which the armor is formed to the armor-forming die, said strips being also shown in position therein.
Fig. 11 is an enlarged sectional view taken through the central mechanism on the broken line 11 11, Fig. 5, and as seen looking at that figure from the right toward the left-hand side of the drawings in the direction of the arrows.
Fig. 12 is an enlarged sectional view of the forming and feeding rolls which form and feed the metallic armor-strips forward to the armor-forming die.
Fig. 13 is a plan view of the trough illustrated in Fig. 10, showing also in plan view its connection with the armor-forming die, the forming and feeding rolls being removed and the metallic armor-strips illustrated in position in said trough in dotted lines.

As $e$ passes along through the box J it is met by the forming and feeding rolls K³ K⁴, the upper one of which, K³, has a grooved periphery, Fig. 12, and the lower, K⁴, a correspondingly-rounded periphery, so that K³ K⁴ form, respectively, the female and male members of a roller-die by which the strip $e$ is shaped into a U form in cross-section, the convexity being upward. In like manner the strip $e'$ is given a U shape or form by the rolls K' K², the concavity of $e'$, however, being upward. As the strips are so shaped or formed by the rolls teeth $l\ l$, upon the periphery of the upper roll K' and upon the periphery of the lower roll K⁴, make a series of indentations or breaks $l'$ upon the inner or concave side of each of the strips. (See Fig. 7.) These breaks $l'$ serve to facilitate the winding of the strips $e\ e'$ in spirals, as will be described. The two series of forming and feeding rolls K' K² and K³ K⁴ are operated from the main motor-shaft O' of the machine by a train of gears, as O⁴ O³ K⁵ K⁶, &c., Fig. 5, the remainder of the train being situated beneath these gears and not shown, and they operate to draw the strips $e\ e'$ from their reels and after shaping them, as described, to drive or force them through the trough J to the armor-forming box L. This box L contains or has rigidly secured to it an interiorly-screw-threaded two-part armor-forming die M, provided on one side with holes M' M², into which the guides $j\ j'$ of the trough J project, so as to leave openings through which the strips $e\ e'$ pass, Figs 8, 11, and 13. One half of this two-part die is provided with dowel-pins and the other with dowel-holes, as clearly illustrated in Fig. 7. As will be seen by referring to Fig. 8, the hole M', through which the strip $e$ passes, is upon the same plane as the hole M², provided for strip $e'$. Both strips enter the screw-threaded die M at an angle to its axis and in line with the screw-grooves $m\ m$, Figs. 7 and 13, which are formed in the longitudinal bore of the die. As the strips $e\ e'$ are forced into these screw-grooves by the friction of the pairs of forming and feeding rolls K' K² and K³ K⁴ they are formed into long spirals, the strip $e'$, which has its convex side outward, fitting into the hollows or grooves $m\ m$ and the strip $e$, which has its concave or hollow side outward, fitting over the projections or ribs $m'\ m'$, as shown in Fig. 7. The electric cable A being fed from its reel B enters the longitudinal bore of the screw-die M, as shown by the dotted lines in Figs. 5 and 7, and passes to the right, the strips $e\ e'$ being formed into a close spiral covering or armor thereon by reason of the fact that as said strips are drawn or fed continuously forward through the agency of the forming and feeding rolls K' K² K³ K⁴ the interior surface of the die constitutes a bending-surface, whereby said strips are caused to be bent or formed into spirals which overlap or break joints with each other. It will be observed that since the holes M' M² are separated by about the width of the strips $e\ e'$ said strips will "break joint," the strip $e'$, which has its cross-sectional curvature outward, being outside of the strip $e$, the latter having a corresponding inward curvature. Thus the downwardly-projecting edges of strip $e'$ when wound on the cable A project into the concavity or groove upon the upper surface of strip $e$, and the upturned edges of strip $e$ interlock into the groove of the adjacent spirals of strip $e'$, so making a complete metallic armor or covering D for the cable A, (see Fig. 7,) which is flexible to the limit of movement of the engaging strips $e\ e'$ within each other, the bending of the cable serving to force the intersecting edges of the strips more closely into contact with each other. Since the power expended in bending the grooved strips $e\ e'$ is sufficient to generate considerable heat, even after the application of a lubricant in the saturated pad $e^4$, I provide below and partly surrounding the lower part of the box L a water-bath, Fig. 11, a continuous supply of cold water being forced through the pipe $n$ to the reservoir N and an outlet being provided through the pipe $n'$. As the armored cable emerges from the screw-die M, being driven spirally to the right by the pressure of the incoming strips $e\ e'$, it passes through the hollow shaft R, Figs. 1 and 5, and into the frame F', which is mounted thereon, where it is wound upon the reel E. The frame F' is revolved in the direction of the arrow Y, Fig. 1, by a train of gears $f'\ f^2$, Fig. 5, which is actuated by the shaft $O^2$, it in turn being operatively connected with the shaft O' of the motor O by the train of gears $4^a\ 7\ 3\ 2\ 1$. (Shown at the left of Fig. 5 and also in Fig. 6.) As the frame F' revolves it acts in turn to revolve the reel E in the direction of the arrow $z$, Fig. 1, thereby winding upon it the flexibly-armored cable as it comes from the armor-forming die. As shown in Fig. 1, this may be accomplished by mounting a stationary wheel or friction device S upon the frame of the machine and mounting upon a shaft $S^3$, revolubly secured to the frame F', wheels $S'\ S^2$ at either end, one of which, as $S'$, travels over the stationary friction device S as the frame F' revolves about its own axis. Thus the shaft $S^3$ is caused to revolve about its own axis, carrying with it the friction-wheel $S^2$, (made of rubber or other suitable material,) which by frictional contact with the reel E produces rotation in the direction of the arrow $z$, as stated.

It will be observed that the gearing $f'\ f^2$ corresponds to the gearing $4\ 4^a$ on the left of C, Fig. 5, gears 4 and $4^a$, as we shall show, being run at the rate of revolution—that is, of formation—of cable-armor D. In other words, the frame F' is driven at a speed corresponding to the feed of the strips $e\ e'$ to the forming-die M. Consequently the cable is delivered to the reel E, which revolves with the frame without any longitudinal twists, and it should be noted that the secondary motion of the reel E about its own axis is likewise proportioned to the speed of feed of the completed cable to it, so that there is no strain in the direction of the cable's length.

Figures 2, 3:
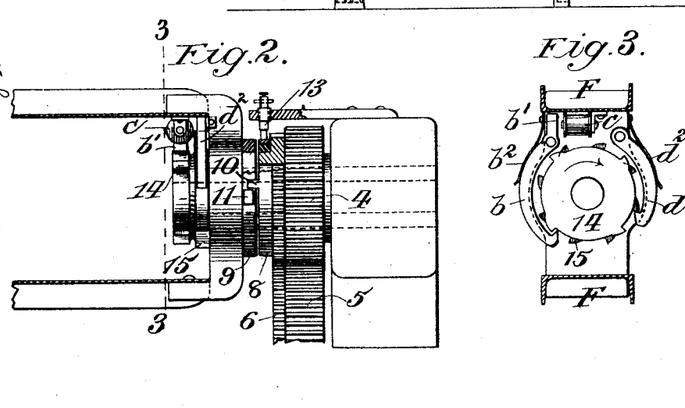
Fig. 2 is an enlarged detail view of the automatic regulating device by which the speed of the left-hand reel is regulated.
Fig. 3 is a sectional view upon the line 3 3 of Figs. 1 and 2.
Figure 14:
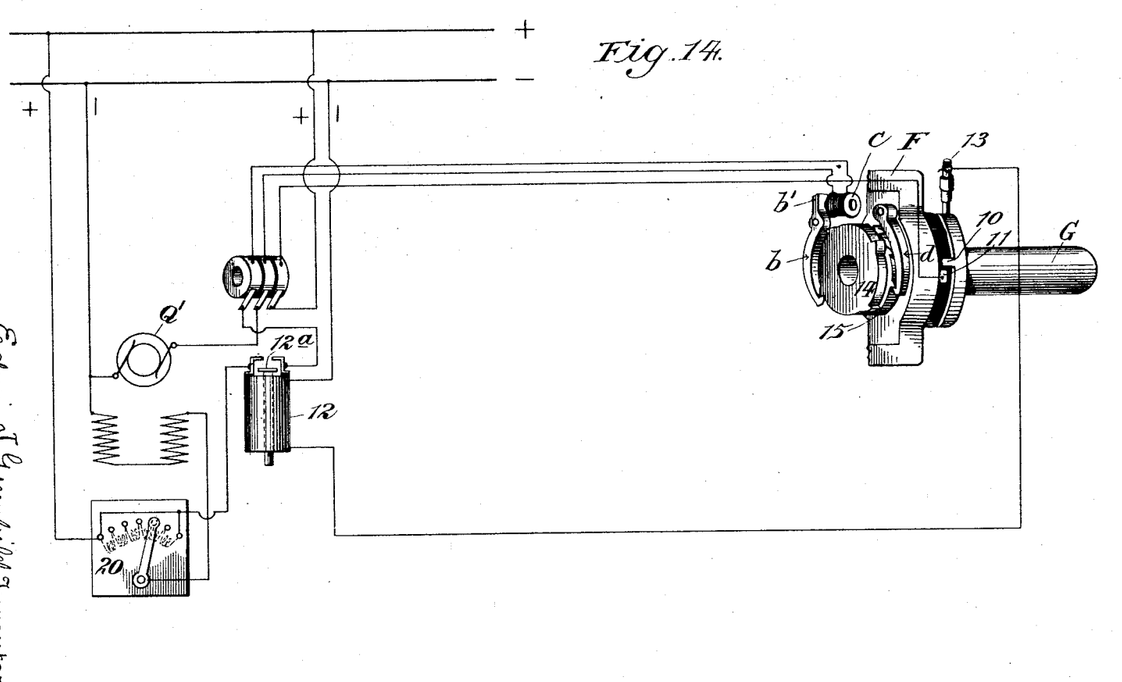
Fig. 14 is a part digrammatic, part perspective, view of the electrical circuits and interconnected mechanism for controlling the operation of the synchronizing mechanism which governs the movements of the cable-carrying reel or reels in such manner as to prevent any possibility of undue torsional effects upon either the cable to be armored or the completed armored cable.

It now remains to discuss the means by which the speed of rotation of the cable-feeding frame F, which carries reel B, is regulated to correspond to the rate of movement of the armor-forming mechanism. Power is transmitted (see Figs. 5 and 6) from the motor O by shaft O' through gear 1 and idlers 2 and 3 to gear 4. Gear 4 is carried by the shaft G, upon which the frame F runs loosely, Figs. 2, 4, and 5. A pawl $d$, carried by frame F, is pressed by a spring $d^2$ into engagement with the ratchet 15, which is fast upon the shaft G. By this or other suitable means the gear 4 causes the frame F to revolve in the direction of the arrow at the left of the line 3 3, Fig. 1. Gear 4 also meshes with idler 5, the shaft of which carries a gear-wheel 6, which is proportioned to run as nearly as may be at the speed at which the strips $e\ e'$ are fed to the forming-die by the power transmitted through gears $K^5\ K^6$. The gear 6 meshes with a similar gear 7, which is loosely mounted upon the shaft of gear-wheel 4. As gear 7 is rotated it carries with it a laterally-projecting wheel or circular band 8, composed of a strip of brass or other electrical conductor mounted upon an insulated body. This metal band 8 has a laterally-projecting metal finger 10, which moves over the surface of a collar 9, composed of fiber or other insulating material, which is carried by the frame F. (See Figs. 2, 5, and 14.) This insulated collar 9 has a contact point or plate 11, of brass or other conductor, placed in the line of travel of the projecting finger 10. As the shaft O' revolves it causes, by means of gears 1, 2, and 3, the revolution of gear 4, which (see Fig. 4) is keyed to the shaft G. Frame F is loosely mounted upon shaft G and caused to revolve therewith by the engagement of pawl $d$, which is carried upon frame F, with a tooth of ratchet 15, which is integral with said shaft G. The revolution of gear 4 transmits, by means of the auxiliary gears 5 and 6, a motion to the gear 7, which corresponds, as we have seen, to the rate of revolution of the armored cable as it emerges from the armoring-box L, (that rate being determined by the speed of the forming and feeding rolls $K'\ K^2\ K^3\ K^4$, which are actuated by gears $K^5\ K^6$, &c.) Now, assuming the rate of revolution of frame F to be less than that of gears 6 and 7, it is evident that the finger 10 of the metal band 8, which is carried by gear 7, will in a few revolutions pass onto and contact with the plate 11. (See Fig. 14.) Now the frame F carries a magnet $c$, which, as shown in Fig. 14, is connected in series with the armature Q' of the auxiliary motor Q, which is normally idle, merely running as a dynamo actuated by the shaft G' of the revolving frame F through gears H H' and shaft $H^2$. The solenoid 12 is connected to the contact-plate 11, Fig. 14, and through the brush 13 to the metal band 8, electrical connection also being had to the starting-box 20 of the motor. When, therefore, the metal finger 10 passes upon the contact-plate 11, a circuit is established from 10 through the solenoid 12 and back to plate 11. The solenoid acts by raising the metal plate 12$^a$ to start the motor Q, and the current from its armature Q' energizes the magnet c, which in turn attracts the free end b' of the pawl b, and this releases the tooth of the ratchet-wheel 14 from its engagement. (See Figs. 3, 6, and 14.) The auxiliary motor Q upon the completion of the circuit and the withdrawal of the pawl b is free to rotate the frame F through the shaft H$^2$ and gears H H'. The power of this auxiliary motor Q soon drives the frame F at a greater speed than that of the gear 7 and enables it to make up the amount of its previous lag. As soon as this is done the contact-plate 11 moves away from finger 10 and the circuit is broken. The pawl b, released from the attraction of magnet c, is pushed by spring b$^2$ back into contact with ratchet 14 and the frame F again moves at normal speed. In practice the contact of finger 10 and plate 11 is momentary, the circuit being broken almost instantaneously by the "jump" or increased speed of frame F under the action of auxiliary motor Q, which carries contact-plate 11 forward and out of contact with finger 10. The action of the magnet c likewise is practically instantaneous, so that the pawl b falls into engagement with the ratchet-tooth next to that from which it has just been raised by the action of the magnet. By this almost instantaneous throwing of the motor Q into and out of gear with the frame F any difference between the speed of revolution of that frame (and consequently of unarmored cable A) and that of the armored cable is equalized before any injurious torque between the cable A and the armor is caused at L. While it would be possible so to proportion the various gears that the frame F would run normally at exactly the same speed of revolution as the armored cable, yet in practice the calculations and tests required before the requisite accuracy could be obtained and the frequency with which errors of calculation or inequalities of wear would be found in such construction sufficient to cause slightly-different speeds, highly injurious in their results, make the attainment of synchronism of movement difficult. It is manifest that as the pawl b engages practically instantaneously with the ratchet-tooth next to that from which it has just been released by the attraction of the magnet c the greatest difference between the position of any one point, as contact 11, on the collar 9 and the corresponding point, as finger 10, upon the band 8 will be the distance between any two teeth upon ratchet 14. These teeth are so spaced that the distance is negligible. Thus the differences in the speed of revolution of the unarmored cable A and of the armored cable are equalized before any harmful torque is set up between the two parts.

While I have described in detail one means of regulating the speed of my cable-feeding apparatus so that it will be equalized with the rate of speed of the armor-forming mechanism, I do not intend to limit myself in any way to the precise construction shown, since many other equivalent forms may be constructed which will come within the spirit of my invention.

While I have described my apparatus as employed for making armor for electric cable, I do not intend to limit it to that use alone, as it is applicable equally well, either as a whole or by detaching individual groups of mechanism, to a variety of other purposes. Thus the middle group of devices C may be used in combination with the right-hand reel E and its attendant parts for making and winding metal tubing or hose which can be used for any desired purpose, with or without an interior lining of fabric or other material. Such interior lining, if desired, may be applied in any suitable manner. So the strips e e' may be grooved by a separate operation before being fed to my bending device or armor-forming die M, in which case the forming and indenting rolls may be omitted and any suitable feeding devices substituted for them, or the winding-reel E, with its attached parts, may be disconnected and the armored cable or tube D may be fed out continuously from the forming-die to any other winding or packing mechanism, or it may be cut off into convenient lengths.

The essential feature of my invention, so far as the mere formation of the armor is concerned, consists in forcing the component strips e e' as they emerge from the trough or shaping-die J into the spiral bending or forming-die M under such external pressure that they form regular and permanent spirals in firm engagement with each other, having a bore of practically unvarying caliber.

Although I have hereinbefore described a machine adapted to armor cables by winding strips of metal therearound in such manner as to interlock, thereby forming a cable with an interlocking armor, and also adapted to form tubes by spirally winding strips of metal in such manner that they interlock and constitute when so wound a flexible tube, I do not limit myself to the particular details of construction referred to, as I believe I am broadly entitled to claim mechanism for armoring cables or conduits by continuously forcing strips of metal through a die and thence around the cable in such manner as to constitute a spirally-wound armor, said method of operation being diametrically opposite in its action from the well-known method of winding a spiral armor about a cable by causing the material of which the armor is composed to be continuously drawn and unwound from its supporting-reel and, together with the reel, rotated about the cable or conduit, which latter is stationary.

I make no claim in the present application to the method of armoring a cable with one or more strips of metal by causing the same to be forced continuously forward against a bending-surface or through a stationary die or dies, nor to mechanism for thus forming a cable with a single strip of metal, as these features constitute the subject-matter of a divisional application filed by me in the United States Patent Office on the 29th day of March, 1899, and bearing Serial No. 710,920.

What I claim as my invention is—

1. The combination of a longitudinal shaping-die provided with guides or grooves extending lengthwise through it, means for driving strips of metal through said shaping-die, and a hollow cylindrical bending-die provided with internal screw-grooves and having lateral openings registering with the guides or grooves in the shaping-die, substantially as and for the purposes described.

2. The combination of means for reversely grooving flat strips of metal with a bending or forming die by which the said strips are formed into successive and overlapping layers of a spiral armor, substantially as and for the purposes described.

3. In a machine for manufacturing cable-armor, the combination of means for reversely grooving the metal strips of which said armor is to be composed, and a die having a cylindrical bore provided with screw-grooves, with lateral openings into said bore for the passage of said strips, substantially as and for the purposes described.

4. In a machine for manufacturing electric cable-armor from a plurality of metal strips, the combination of a longitudinal trough or shaping-die provided with a guide or groove for each of said strips, together with means for shaping each of said strips into a U form of cross-section and means for causing said strips to form an overlapping or interlocking armor therefrom, substantially as described.

5. In a machine for armoring electric cables, the combination of guides or grooves with means in the nature of forming and feeding rolls for simultaneously giving to strips of metal a U form and feed the same forward through said guides or grooves, said rolls being provided with teeth for giving to each strip breaks or indentations upon its hollow side, substantially as described.

6. In a device for making armor for electric cables, the combination of metal forming and feeding rolls for shaping the component strips of the armor and feeding or drawing them forward, means for actuating said metal forming and feeding rolls so as to force the said strips through guides or grooves, and a cylindrical die provided with screw-grooves in its bore, said cylindrical die having lateral openings registering with the said guides or grooves for the strips, substantially as and for the purposes described.

7. In a machine for armoring electric cables, the combination of means for rotating the supply of unarmored cable, means for passing said rotating cable to armor-forming mechanism, means for applying armor spirally to said cable, a winding-reel adapted to be rotated about its own axis and in the direction of rotation of the cable, with means for continuously delivering the armored cable to said winding-reel.

8. In a machine for making armor for electric cables, the combination of mechanism for forming said armor spirally and delivering the same continuously while rotating about its own axis, of a rotatable frame, means for rotating said frame in the same direction that the armor is rotated, a reel journaled in said rotating frame, a series of friction-wheels for imparting to said reel motion about its own axis, and a motor operatively connected to each of said rotating devices, substantially as and for the purposes described.

9. Mechanism for forming from strips of metal an armor about a cable, in combination with mechanism for delivering said cable continuously to be armored, said mechanism consisting of a rotary frame and a reel carrying the cable together with means for causing said cable and reel to rotate in unison with the cable as it is being armored, substantially as described.

10. In a machine for armoring electric cables, mechanism for applying the armor to the cable spirally, a frame adapted to carry and deliver the unarmored cable to the armoring mechanism, and means for continuously rotating said frame, in combination with means for automatically altering the speed of rotation of said frame, substantially as and for the purposes described.

11. In a machine for armoring electric cables, the combination of a motor, mechanism driven by said motor adapted to apply the armor to the cable spirally at a substantially uniform speed, a main power-transmitting mechanism driven by said motor, a frame adapted to be revolved thereby, an auxiliary power-transmitting mechanism actuated by said motor and an auxiliary motor controlled by an electric circuit adapted to be completed by variations between the speed of the auxiliary and the main power-transmitting mechanisms, substantially as described.

12. In a speed-regulating mechanism, the combination of a normally idle auxiliary motor, a frame adapted to be operated by said motor, means for normally rotating said frame, an independently-rotating collar mounted upon the shaft of said frame, electrical contacts mounted upon said frame and said independently-rotating collar, and adapted to come into engagement when said frame and collar are rotated at different speeds, said contacts completing the electrical circuit by which said auxiliary motor is put in operative relation to said frame.

13. In a machine for spirally armoring electric cables, the combination of a frame for delivering the unarmored cable in continuous rotation, means for normally actuating said frame at substantially the speed of the armoring device, an auxiliary motor operatively connected with said frame and normally idle, and means for energizing said auxiliary motor, said energizing means consisting of electrical conductors brought into contact by the variation in speed of rotation of the said frame, substantially as and for the purposes described.

14. In an armoring-machine the combination of feeding mechanism for feeding the material to be armored; bending mechanism for bending armor-strips around said material; feeding mechanism for feeding said strips forward to the bending mechanism; an electric motor for rotating the first-named feeding mechanism, said motor being included in an electric circuit, together with means for closing said circuit whenever the speed of the feeding mechanism varies beyond a definite amount, substantially as described.

15. In a machine for forming strips of metal into a tube, the combination of means for forcing the strips forward continuously, with a bending-die placed in the line of travel of the strips, said bending-die being so constructed and located with relation to the delivery of the strips that when the latter are forced therethrough a completed tube is constructed, the lateral edges of the strips being adjacent to each other and in substantial alinement, substantially as described.

16. Mechanism for forming a tube from strips of metal consisting of guides or grooves for said strips and a forming-die operatively connected with said guides or grooves, together with means for forcing said strips through said guides or grooves against the inner surface of the die and in such manner as to complete a tube of successive spirals, the lateral edges of the strips in the completed tube being adjacent to each other and in substantial alinement.

EDWIN T. GREENFIELD.

Witnesses:
M. LAWSON DYER,
DRURY W. COOPER.